(12) United States Patent
Lin

(10) Patent No.: US 9,838,252 B2
(45) Date of Patent: Dec. 5, 2017

(54) METHOD FOR AUTOMATICALLY CONFIGURING GATEWAY DEVICE THROUGH A MOBILE DEVICE

(71) Applicant: Alpha Networks Inc., Hsinchu (TW)

(72) Inventor: Jin-Fuu Lin, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 181 days.

(21) Appl. No.: 14/310,771

(22) Filed: Jun. 20, 2014

(65) Prior Publication Data

US 2015/0172118 A1    Jun. 18, 2015

(30) Foreign Application Priority Data

Dec. 18, 2013    (TW) .............................. 102146880 A

(51) Int. Cl.
   *H04L 12/24* (2006.01)

(52) U.S. Cl.
   CPC ...... *H04L 41/0806* (2013.01); *H04L 41/0869* (2013.01); *H04L 41/0886* (2013.01)

(58) Field of Classification Search
   None
   See application file for complete search history.

(56) References Cited

U.S. PATENT DOCUMENTS

| | | | | |
|---|---|---|---|---|
| 6,618,360 B1 * | 9/2003 | Scoville | .............. | H04L 12/2697 370/248 |
| 8,064,927 B2 * | 11/2011 | Hsu | .................... | H04L 12/189 455/3.01 |
| 9,264,432 B1 * | 2/2016 | Liu | .................... | H04L 63/0892 |
| 2005/0259638 A1 * | 11/2005 | Burg | .................. | H04L 12/1813 370/352 |
| 2006/0242038 A1 * | 10/2006 | Giudilli | .................. | H04L 12/14 705/35 |
| 2009/0109941 A1 * | 4/2009 | Carter | .................. | H04W 12/06 370/338 |
| 2009/0158392 A1 * | 6/2009 | Hughes | .................. | H04L 63/08 726/3 |
| 2009/0323555 A1 * | 12/2009 | Lancaster | .......... | H04L 41/0253 370/254 |

(Continued)

*Primary Examiner* — Chirag Shah
*Assistant Examiner* — Joshua Smith
(74) *Attorney, Agent, or Firm* — Bacon & Thomas, PLLC

(57) ABSTRACT

The present invention is to provide a method for automatically configuring a gateway device through a mobile device, wherein the gateway device is installed with configuration software for connecting to a mobile device through a wireless communication unit thereof, and the mobile device is installed with automatic network connection software and configuration information. After activating the automatic network connection software, the mobile device reads the configuration information, searches for currently available wireless network device, establishes a peer-to-peer connection with the gateway device corresponding to the wireless network device whose Service Set Identifier (SSID) matches the SSID in the configuration information, and then activates the configuration software and sends the configuration information to the gateway device. Once the configuration software obtains the configuration information, a network connection configuration process of the gateway device is automatically completed.

3 Claims, 6 Drawing Sheets

(56) References Cited

U.S. PATENT DOCUMENTS

| | | | | |
|---|---|---|---|---|
| 2010/0082978 A1* | 4/2010 | Suzuki | ........... | H04L 63/083 |
| | | | | 713/168 |
| 2011/0113252 A1* | 5/2011 | Krischer | ........... | H04L 63/0823 |
| | | | | 713/175 |
| 2011/0210171 A1* | 9/2011 | Brown | ........... | H04L 63/0492 |
| | | | | 235/382 |
| 2012/0233070 A1* | 9/2012 | Calman | ........... | H04W 4/021 |
| | | | | 455/414.1 |
| 2012/0266217 A1* | 10/2012 | Kaal | ........... | H04L 63/0407 |
| | | | | 726/4 |
| 2013/0064132 A1* | 3/2013 | Low | ........... | H04W 24/02 |
| | | | | 370/254 |
| 2013/0203383 A1* | 8/2013 | Stopel | ........... | H04W 12/08 |
| | | | | 455/411 |
| 2013/0294354 A1* | 11/2013 | Zhang | ........... | H04W 72/04 |
| | | | | 370/329 |
| 2014/0112325 A1* | 4/2014 | Calcev | ........... | H04W 48/16 |
| | | | | 370/338 |
| 2015/0163625 A1* | 6/2015 | Saida | ........... | H04W 4/02 |
| | | | | 455/456.1 |
| 2015/0223059 A1* | 8/2015 | Canpolat | ........... | H04W 48/18 |
| | | | | 726/7 |

* cited by examiner

Account No.: ☐☐☐☐☐☐☐☐☐☐☐☐

Client No.: 12345678

Client Password: abcdefgh

SSID: XYZ

FIG. 3B

METHOD FOR AUTOMATICALLY CONFIGURING GATEWAY DEVICE THROUGH A MOBILE DEVICE

FIELD OF THE INVENTION

The present invention relates to a gateway device, more particularly to a method for automatically configuring a gateway device through a mobile device, so that the mobile device only has to obtain configuration information from the gateway device in advance by using recognition software installed therein, and then enables the gateway device to automatically complete a network connection configuration process for connecting to an external network without a user having to manually input the configuration information to the gateway device.

BACKGROUND OF THE INVENTION

A router is a computer network device located at the junction between, and configured to connect, at least two networks. More specifically, a router performs routing by sending data packets through the networks to the destination (s). As the availability of broadband connection increases, more and more people install routers in their homes and connect several terminal devices (e.g., personal computers) to one router so as for the terminal devices to connect to and access data on the Internet through the router. In addition to wired routers, wireless routers were developed for use with wireless terminal devices (e.g., mobile phones, laptop computers). A wireless terminal device connects to a wireless router via Wi-Fi or other wireless communication technologies and thereby connects to the Internet.

Take commercially available wireless routers for example. In order for a wireless router to work properly, the user must install the installation program of the wireless router into a computer, connect the wireless router to the computer with a cable, and perform Wide Area Network (WAN) or Local Area Network (LAN) configuration of the wireless router through the computer. Once the WAN or LAN configuration is completed, an input window is displayed on the computer to guide the user through a wireless network configuration process of the wireless router. During the process, regardless of whether the Wired Equivalent Privacy (WEP) or Wi-Fi Protected Access (WPA) wireless security mechanism is used, the user is required to input such routing configuration parameters as the Service Set Identifier (SSID), the selected channel, the WEP or WPA coding/decoding method to be used, and a key. After that, the cable between the computer and the wireless router is removed, and a wireless client (e.g., a wireless network card) is connected to the computer to enable wireless transmission between the wireless client and the wireless router. As it is necessary to memorize the wireless network configuration parameters and the complicated configuration procedure during installation of the wireless router, it is by no means easy for an ordinary user to complete the installation process with success. The installation, in other words, is inconvenient and troublesome.

Moreover, since few users have the knowledge of advanced network technology and are familiar with how cables should be connected to a router and what the light signals of a router mean, should a terminal device fail to connect to the Internet due to a wrongly configured wireless router, the user tends not to hesitate to make phone calls to the Internet Service Provider (ISP) for help. Such phone calls, however, turn into a tremendous labor and financial burden on the ISP, which is highly undesirable. If the user decides to solve the problem by referring to the router's user guide (either in paper or CD format), chances are the document or CD is missing, so the desired troubleshooting instruction cannot be found. Consequently, this DIY approach can be both inconvenient and ineffective. Even if the user guide CD is well kept, it is necessary for the user to install the troubleshooting or explanation program from the CD to the terminal device when network connection problems occur. As the installation process may be onerous and time-consuming, the user is very likely to be inconvenienced, too.

Therefore, the issue to be addressed by the present invention is to design a method which helps consumers by automatically configuring wireless routers or other similar gateway devices.

BRIEF SUMMARY OF THE INVENTION

In view of the fact that the configuration process of the conventional gateway devices (e.g., routers) is so complicated that users often have problems configuring and initializing the gateway devices to be used, the inventor of the present invention conducted extensive research and experiment and finally succeeded in developing a method for automatically configuring a gateway device through a mobile device as disclosed herein. The present invention is intended to provide a more convenient configuration method which can create a better user experience and increase gateway device manufacturers' market competitiveness.

It is an objective of the present invention to provide a method for automatically configuring a gateway device through a mobile device so that a user installing the gateway device for the very first time does not have to manually input lots of data. The method is applicable to a network system which includes a mobile device (e.g., a smart phone), a gateway device (e.g., a router) and an external network. The gateway device is provided with a wireless communication unit and is installed with configuration software so as to connect to the mobile device through the wireless communication unit. The mobile device is installed with automatic network connection software and configuration information, wherein the configuration information includes a Service Set Identifier (SSID) and routing information (e.g., IP address, channel, connection method, Media Access Control (MAC) address, time, coding/decoding methods, a key, etc.) corresponding to the gateway device and an account number and a password corresponding to the external network. After activating the automatic network connection software, the mobile device reads the configuration information, searches for currently available wireless network device, and establishes a peer-to-peer connection with the gateway device corresponding to the wireless network device whose SSID matches the SSID in the configuration information. After that, the mobile device activates the configuration software of the gateway device and sends the account number, the password, and the routing information to the gateway device. Once the configuration software of the gateway device obtains the account number, the password, and the routing information, a network connection configuration process is automatically completed. Hence, the user only has to obtain the configuration information of the gateway device in advance using recognition software in the mobile device (e.g., a Quick Response code (QR code) scanner, an Optical Character Recognition (OCR) scanner, or other software), the gateway device can be rapidly configured without the user having to input the account number, the password, and the routing information one after another. In short, the convenience with which the gateway device can be used and with which the mobile device can be connected to a wireless network is greatly enhanced.

Another objective of the present invention is to provide the foregoing method, wherein the mobile device further transmits a network connection testing message to the gateway device, and wherein the gateway device will transmit a successful network connection message to the mobile device once successfully connected to the external network (such as connecting to the Internet through a modem provided by ISP), or an unsuccessful network connection message to the mobile device if otherwise. This allows the user to rapidly know whether the gateway device is properly configured, sparing the user the trouble of having to test network connections by themselves. Thus, the present invention provides the user with a more intuitive and streamlined configuration process.

BRIEF DESCRIPTION OF THE SEVERAL VIEWS OF THE DRAWINGS

The above and other objectives, as well as the technical features and their effects, of the present invention will be best understood by referring to the following detailed description of some illustrative embodiments in conjunction with the accompanying drawings, in which:

FIG. 3B schematically shows a physical account number card 2B of the present invention; and FIG. 4 is the flowchart of the control system of the present invention, wherein FIG. 4 is composed of FIG. 4A and FIG. 4B joined together by the connector A.

DETAILED DESCRIPTION OF THE INVENTION

Figure 1:
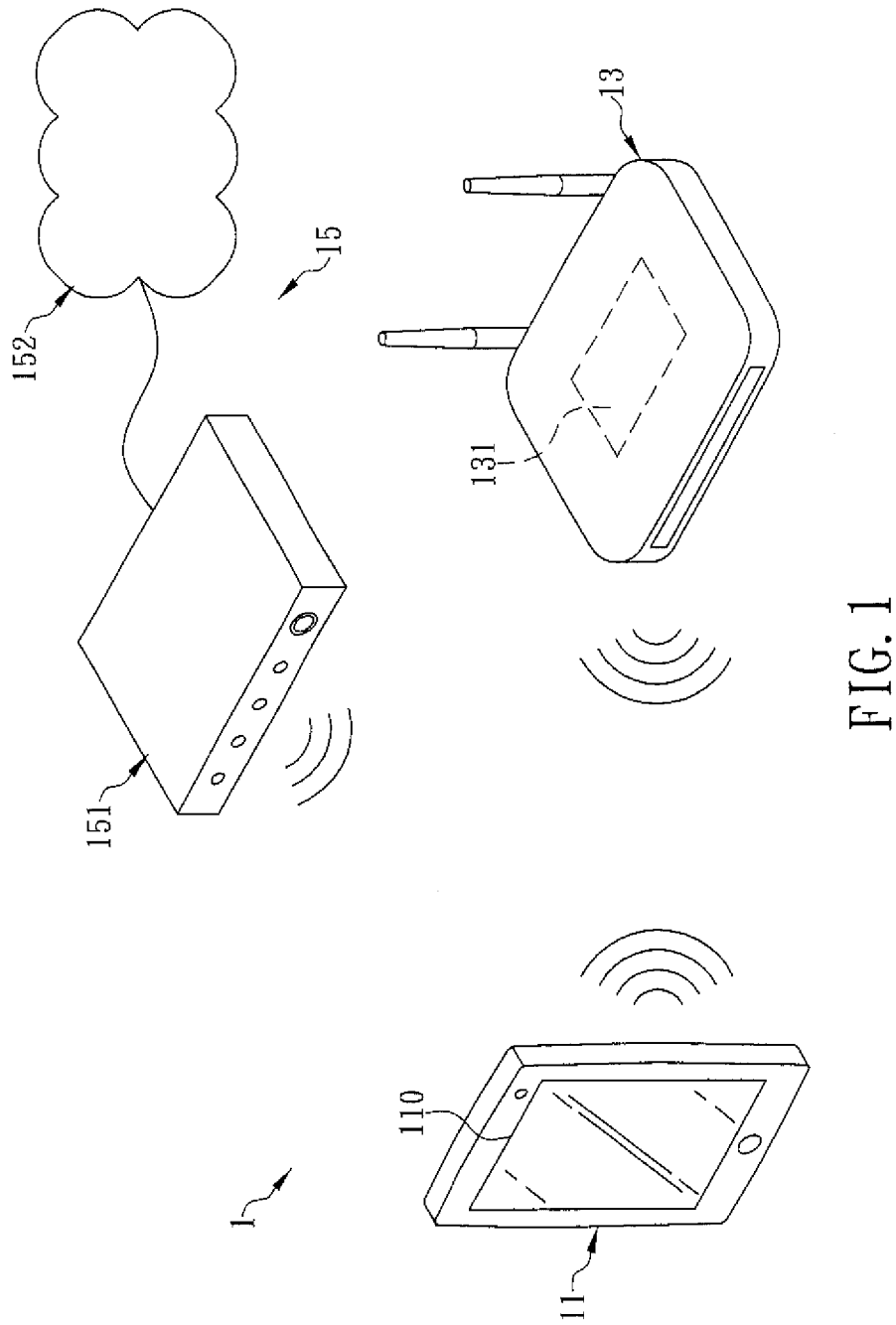
FIG. 1 schematically shows the network system of the present invention.

The present invention relates to a method for automatically configuring a gateway device through a mobile device, wherein the method is applicable to a network system. In one embodiment, referring to FIG. 1 and FIG. 2, the network system 1 includes a mobile device 11 (e.g., a smart phone), a gateway device (e.g., a router) 13 and an external network 15 (e.g., a modem 151 provided by ISP and the Internet 152). The mobile device 11 is capable of making wireless network connections, is installed with automatic network connection software 111, and is provided with configuration information 113. The configuration information 113 at least includes an SSID and routing information (e.g., IP address, connection method, MAC address, time) corresponding to the gateway device 13 and an account number and a password corresponding to the external network 15.

The content of the configuration information 113 enables the gateway device 13 to complete the required connection configuration, wherein the account number and the password are the information required when a user applies for network services from an ISP and when the user desires to connect to the Internet.

Figure 2:
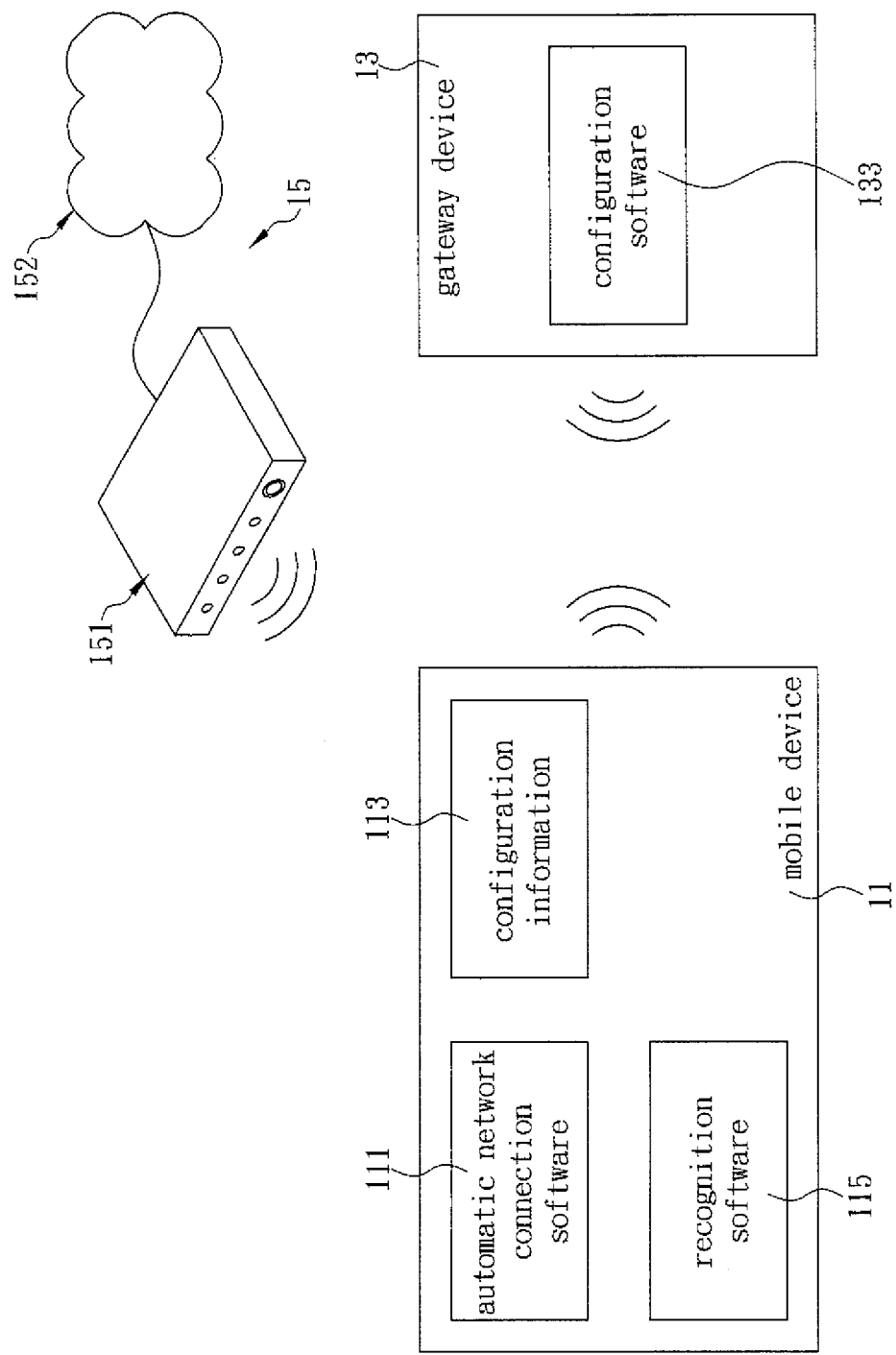
FIG. 2 is a block diagram of the network system of the present invention.
Figure 3A:
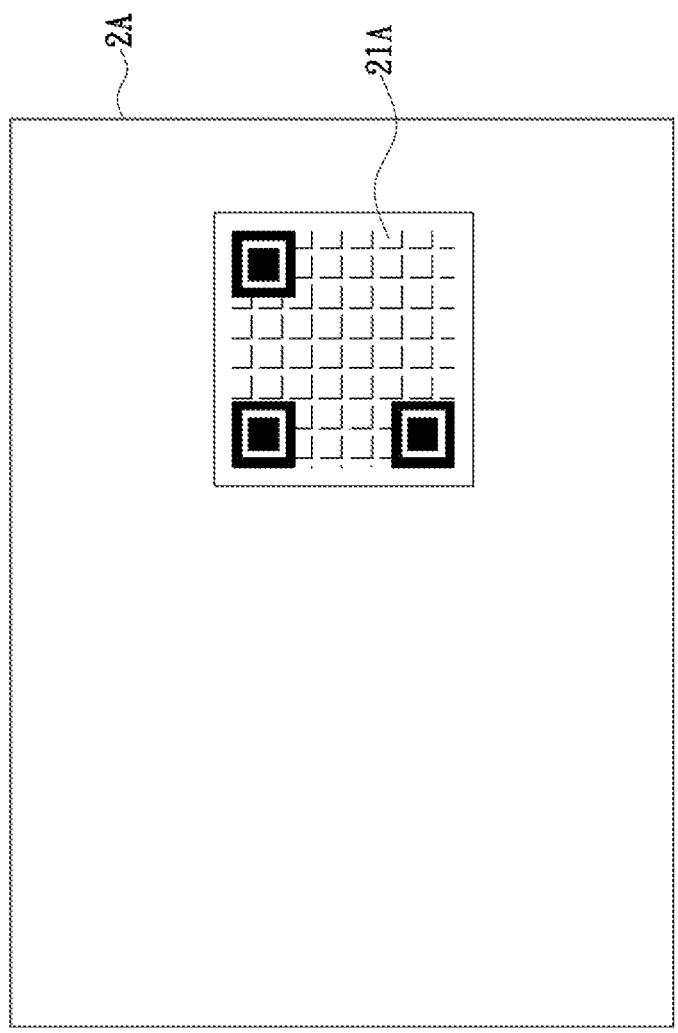
FIG. 3A schematically shows a physical account number card 2A of the present invention.
Figure 4A:
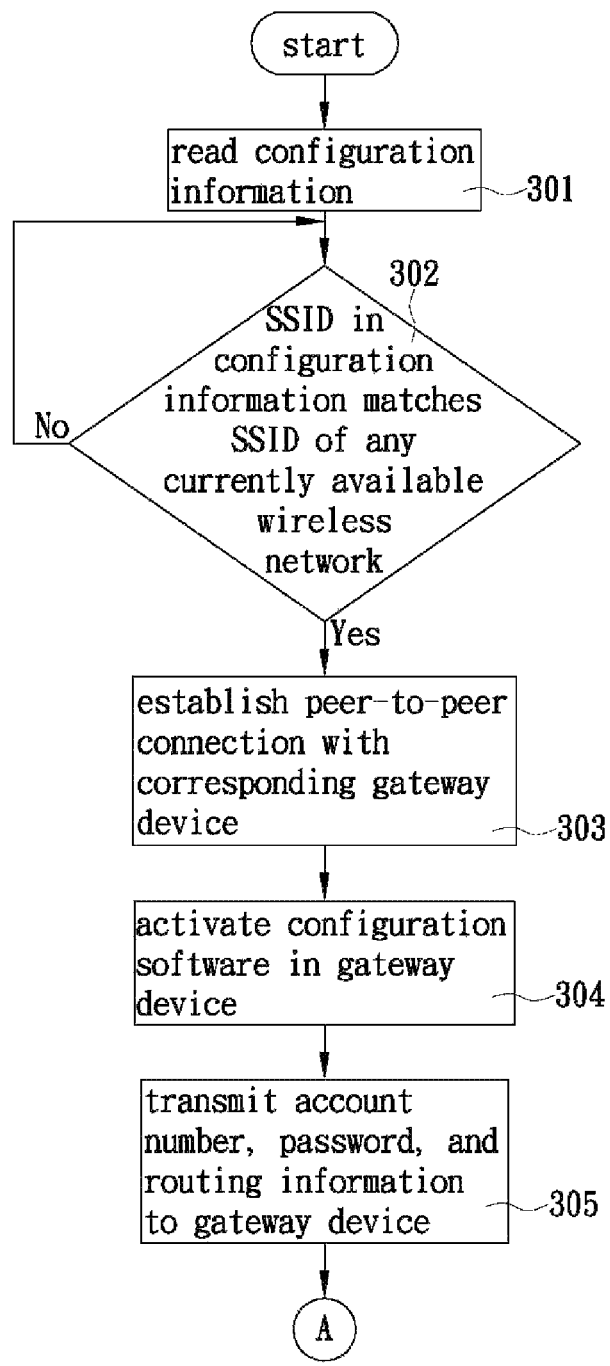
Figure 4B:
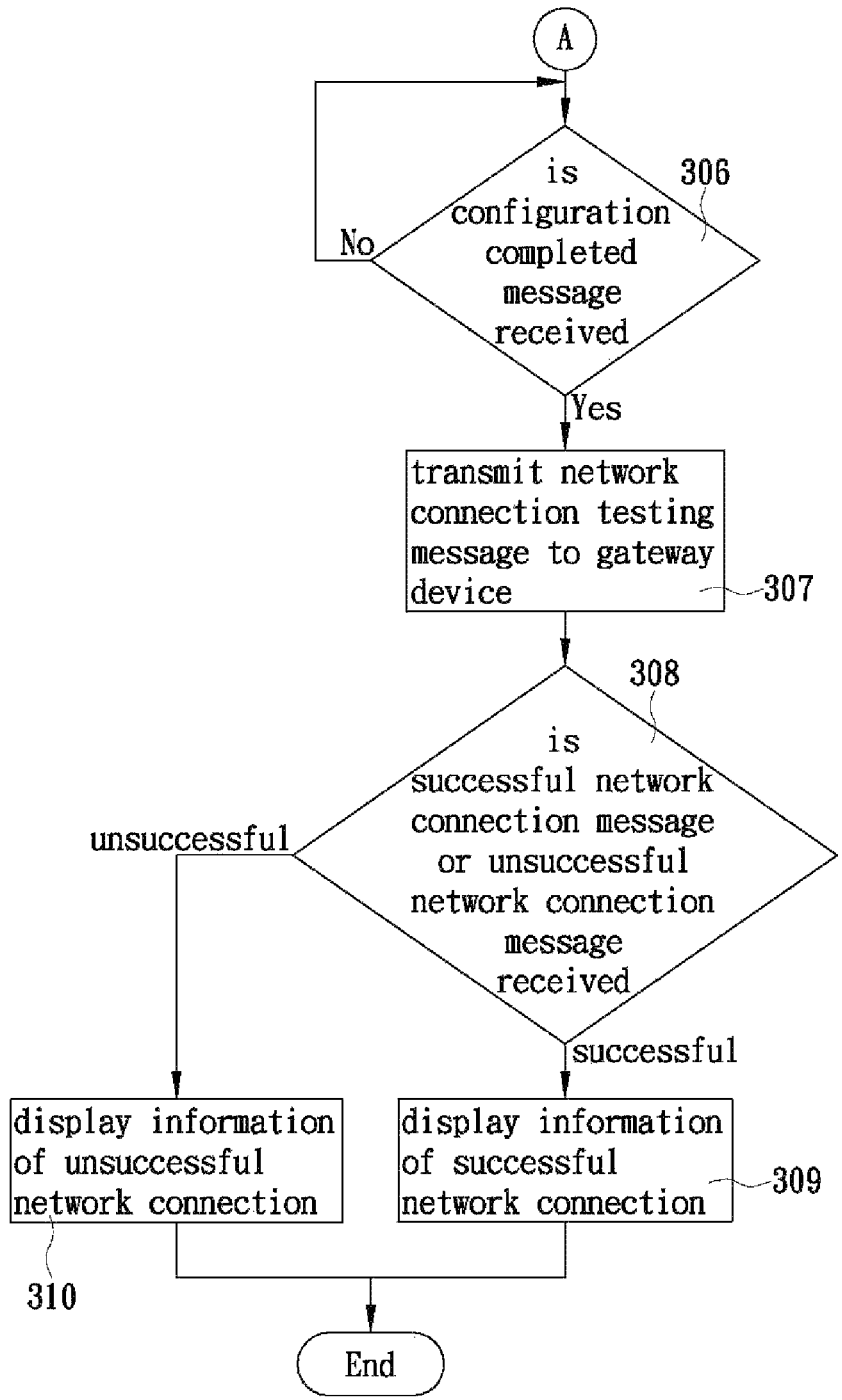

Referring to FIG. 1 and FIG. 2, in order for the user to obtain the aforesaid data conveniently and rapidly, the mobile device 11 is designed to obtain the configuration information 113 in at least one of the following ways:

(1) Referring to FIG. 3A, the ISP may provide the user with a physical account number card 2A which carries a QR code 21A, and the QR code 21A includes the configuration information 113. The mobile device 11 can take an image of the QR code 21A with a built-in camera (not shown) and then read the configuration information 113 in the QR code 21A with the recognition software 115 (e.g., QR code reader software) provided in the mobile device 11.

(2) Referring to FIG. 3B, the ISP may provide the user with a physical account number card 2B which carries the configuration information 113 in print or in writing. The mobile device 11 can take an image of the configuration information 113 with a built-in camera (not shown) to create an image file 21B. Then, the configuration information 113 in the image file 21B is read by the recognition software 115 (e.g., OCR software) provided in the mobile device 11.

(3) Referring to FIG. 3A and FIG. 3B, the ISP may send the QR code 21A or the image file 21B to the user's mobile device via an email or an electronic message, or in other ways, wherein the QR code 21A or the image file 21B contains the configuration information 113. The configuration information 113 in the QR code 21A or the image file 21B is then read by the recognition software 115 provided in the mobile device 11.

(4) The ISP may directly send the configuration information 113 to the user's mobile device for storage, and the mobile device can directly read the content of the configuration information 113.

With continued reference to FIG. 1 and FIG. 2, the gateway device 13 is provided with a wireless communication unit 131 and is installed with configuration software 133. The gateway device 13 can connect to the mobile device 11 by way of the wireless communication unit 131. The configuration software 133 enables the gateway device 13 to complete the configuration required for making network connections. When a consumer who has bought the gateway device 13 tries to configure the gateway device 13 for the first time, the following steps are performed. To begin with, the user operates the mobile device 11 to activate the automatic network connection software therein. Then, the mobile device 11 reads the configuration information, searches for currently available wireless network devices, and obtains the SSIDs of all the currently available wireless network devices. The mobile device 11 establishes a peer-to-peer connection with the gateway device 13 corresponding to the wireless network device whose SSID matches the SSID in the configuration information. Afterward, the mobile device 11 transmits an activation message to the gateway device 13 to activate the configuration software 133 in the gateway device 13. Following that, the mobile device 11 transmits the account number, the password, and the routing information to the gateway device 13 in order for the configuration software 133 in the gateway device 13 to automatically input the account number, password, and routing information received, thereby completing the network connection configuration process. It is feasible for the mobile device 11 to transmit the configuration information to the gateway device 13 by an email, an electronic message, or other wireless transmission methods, and to receive the aforesaid data by reading an account number card, an email, or an electronic message, or by other wireless transmission methods.

Referring again to FIG. 1 and FIG. 2, after finishing the network connection configuration process, the gateway device 13 transmits a configuration completed message to the mobile device 11. Upon receiving the configuration completed message, the mobile device 11 transmits a network connection testing message to the gateway device 13 in order for the gateway device 13 to automatically connect to the external network 15 (such as connecting to the Internet 152 through the modem 151 provided by ISP). If successfully connected to the external network 15, the gateway device 13 transmits a successful network connection message to the mobile device 11. If the gateway device 13 cannot connect to the external network 15, it transmits an unsuccessful network connection message to the mobile device 11. The mobile device 11 will display the information of successful network connection or unsuccessful network connection on a display screen 110, allowing the user to rapidly know whether the gateway device 13 is properly configured and can connect to the external network 15. Hence, with the method of the present invention, the user can readily configure the gateway device 13 without having to input the account number, the password, and the routing information one after another, provided that the mobile device 11 obtains the configuration information of the gateway device 13 in advance. As such, the use of the gateway device 13 and network connection through the gateway device 13 are made much easier than without employing the present invention.

To clearly disclose the method described above, the procedure to be performed by the mobile device 11 after activating the automatic network connection software 111 is detailed as follows, with reference to FIG. 1, FIG. 2, FIG. 4A, and FIG. 4B.

(301) The mobile device 11 reads the configuration information 113. The procedure goes on to step (302).

(302) The mobile device 11 searches for currently available wireless network devices and determines whether the SSID in the configuration information 113 matches the SSID of any of the currently available wireless network devices found. Step (303) is performed if yes, and step (302) is performed again if no.

(303) The mobile device 11 connects in a peer to peer manner to the gateway device 13 corresponding to the wireless network device with the matching SSID. The procedure continues to step (304).

(304) The mobile device 11 activates the configuration software 133 in the gateway device 13. Then, step (305) is executed.

(305) The mobile device 11 transmits the account number, the password, and the routing information to the gateway device 13 so as for the gateway device 13 to automatically complete the network connection configuration process. The procedure goes on to step (306).

(306) The mobile device 11 determines whether a configuration completed message is received from the gateway device 13. If yes, go on to step (307); otherwise, return to step (306).

(307) The mobile device 11 transmits a network connection testing message to the gateway device 13 in order for the gateway device 13 to automatically connect to the external network 15. The procedure continues to step (308).

(308) The mobile device 11 determines whether a successful network connection message or an unsuccessful network connection message is received. Step (309) is performed if the successful network connection message is received; step (310) is performed if the unsuccessful network connection message is received.

(309) The mobile device 11 displays the information of successful network connection.

(310) The mobile device 11 displays the information of unsuccessful network connection.

Therefore, referring back to FIG. 1 through FIG. 3B, as long as the mobile device 11 can obtain the configuration information 113 of the gateway device 13 beforehand, e.g., by way of the recognition software 115 or by the ISP sending the information to the mobile device 11, the mobile device 11 can rapidly configure the gateway device 13 without need to sequentially input the account number, the password, and the routing information. Consequently, the use of the gateway device 13 and network connection therethrough becomes more convenient than in the prior art. In addition, as the mobile device 11 can enable the gateway device 13 to automatically connect to the external network 15, and the gateway device 13 will send a successful network connection message or an unsuccessful network connection message to the mobile device 11 depending on whether the gateway device 13 has successfully connected to the external network 15, the user only has to activate the automatic network connection software 111, and he or she will know if the gateway device 13 has completed the network connection configuration. This significantly reduces the difficulty faced by the user when installing the gateway device 13 for the first time.

While the invention herein disclosed has been described by means of specific embodiments, numerous modifications and variations could be made thereto by those skilled in the art without departing from the scope of the invention set forth in the claims.

What is claimed is:

1. A method for automatically configuring a gateway device through a mobile device, wherein the method is applicable to a network system including a mobile device, a gateway device and an external network, the gateway device is provided with a wireless communication unit and installed with configuration software so as to establish a peer-to-peer connection with the mobile device through the wireless communication unit, the mobile device is installed with automatic network connection software and arranged to acquire configuration information without the user having to manually input an account number, a password corresponding to an external network, and routing information corresponding to the gateway device, the configuration information at least including a Service Set Identifier (SSID) and the routing information, the account number, and the password, the method comprising the steps, performed by the mobile device after the automatic network connection software is activated, of:

the mobile device reading the configuration information, wherein the mobile device is installed with a recognition software for acquiring the configuration information included in a Quick Response code (QR code);

the mobile device searching for any currently available wireless network device in order to obtain SSIDs of all said currently available wireless network devices;

the mobile device determining whether the SSID in the configuration information matches the SSID of any said currently available wireless network device, and, if yes, establishing a peer-to-peer connection with the gateway device corresponding to the wireless network device whose said SSID matches the SSID in the configuration information;

the mobile device activating the configuration software in the gateway device;

the mobile device transmitting the account number, the password, and the routing information to the gateway device to enable the configuration software of the gateway device to automatically complete a network connection configuration process after obtaining the account number, the password, and the routing information from the mobile device;

the mobile device receiving a configuration completed message transmitted from the gateway device when the gateway device has completed the network connection configuration process;

transmitting a network connection testing message to the gateway device after receiving the configuration completed message; and receiving a successful network connection message from the gateway device when the gateway device has successfully connected to the external network, or receiving an unsuccessful network connection message from the gateway device when the gateway device is unable to connect to the external network.

2. The method of claim 1, wherein the mobile device transmits the configuration information to the gateway device via an email or an electronic message.

3. The method of claim 1, wherein the mobile device receives the configuration information via an email or an electronic message or by reading an account number card.

* * * * *